F. W. HARRIS.
AUTOMOBILE FENDER.
APPLICATION FILED APR. 10, 1916.
1,207,909.
Patented Dec. 12, 1916.
2 SHEETS—SHEET 1.
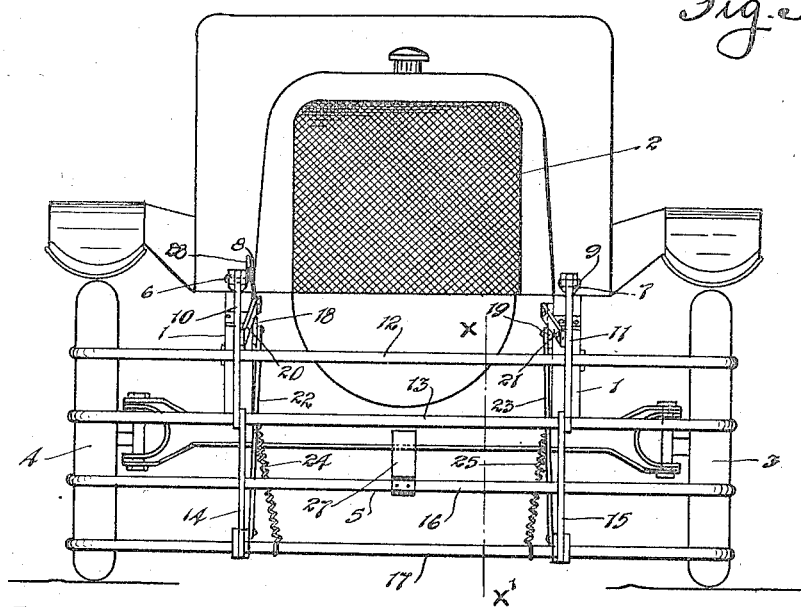
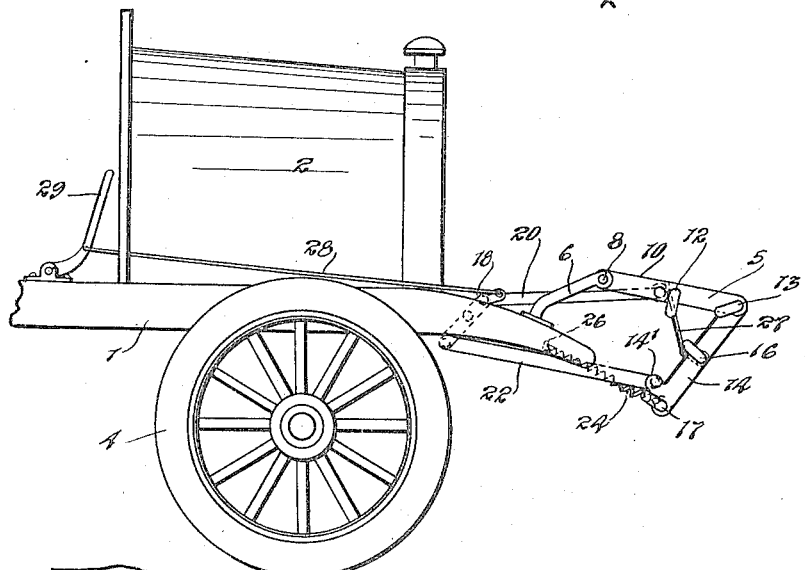
WITNESSES
INVENTOR
F. W. Harris
By
Attorneys

F. W. HARRIS.
AUTOMOBILE FENDER.
APPLICATION FILED APR. 10, 1916.

1,207,909.

Patented Dec. 12, 1916.
2 SHEETS—SHEET 2.

WITNESSES

INVENTOR
F. W. Harris

By

Attorneys

UNITED STATES PATENT OFFICE.

FREDERICK WILLIAM HARRIS, OF TATE, SASKATCHEWAN, CANADA.

AUTOMOBILE-FENDER.

1,207,909.  Specification of Letters Patent.  Patented Dec. 12, 1916.

Application filed April 10, 1916. Serial No. 90,146.

*To all whom it may concern:*

Be it known that I, FREDERICK WILLIAM HARRIS, of the village of Tate, in the Province of Saskatchewan, Canada, have invented certain new and useful Improvements in Automobile-Fenders, of which the following is the specification.

The invention relates to improvements in automobile fenders, and the principal object of the invention is to provide a fender which can be readily attached to the chassis of the automobile and which when applied and set will operate, upon being struck by an object, to drop and prevent the object from passing under the wheels of the car.

A further object of the invention is to construct the above device in an inexpensive durable and efficient manner and in such a way that it is adaptable to the various styles of automobiles now on the market.

A still further object of the invention is to provide a means whereby the fender can be manipulated by the driver of the automobile if desired.

Figure 2:
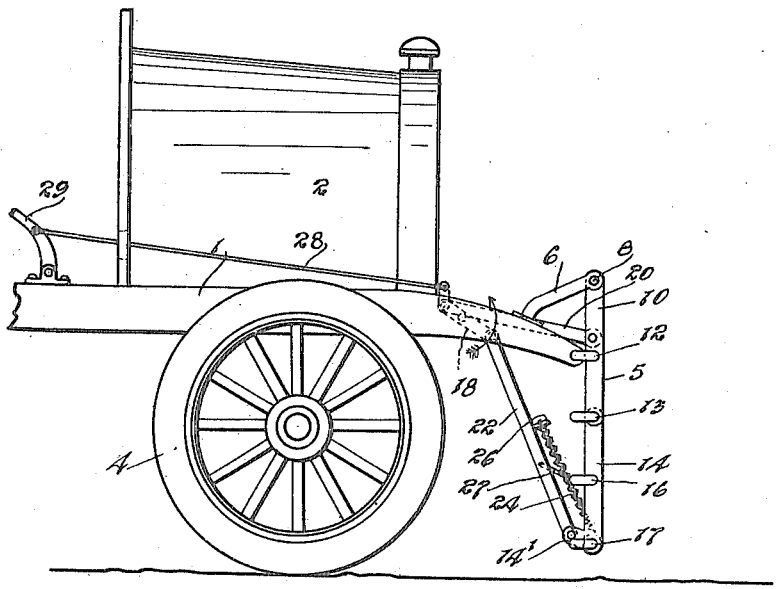
Figure 4:
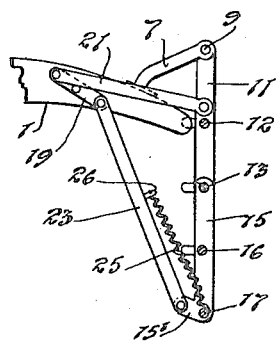

With the above objects in view the invention consists essentially in a centrally and horizontally hinged fender pivotally suspended from the front of the car, a pair of pivoted levers connected to the chassis of the car, upper and lower bars connecting the opposite ends of the levers with the fender, springs interposed between the lower bars and the fender and a stop carried by the lower portion of the fender and engageable with the upper portion thereof, the parts being arranged and constructed as hereinafter more particularly described and later pointed out in the appended claims, reference being had to the accompanying drawings in which:

Figure 1 represents a side view of the fender as applied on the automobile and in the up or normal position. Fig. 2 is a side view of the fender applied on the automobile and in the operating or lower position. Fig. 3 is a front view of the parts as they appear in Fig. 2. Fig 4 is a vertical sectional view centrally through the fender, the section being taken in the plane denoted by the line X—X' Fig. 3.

In the drawings like characters of reference indicate corresponding parts in each figure.

1 represents the chassis of an automobile, 2 the radiator thereof and 3 and 4 the front wheels which support the chassis in the usual way.

The above parts are of ordinary construction and for this reason are not herein further described.

5 represents my fender which is constructed as now disclosed.

6 and 7 designate a pair of brackets permanently secured to the front end of the chassis and carrying pivot pins 8 and 9 from which I suspend pivotally the upper ends of upper links 10 and 11 which carry tubular cross guards 12 and 13, said guards having back-turned ends as shown. The guard 13 passes through the extremities of the links and supports pivotally lower links 14 and 15 similar to links 10 and 11, and these lower links in turn carry tubular guards 16 and 17 having back-turned ends.

From the above it is obvious that the fender is a two-part one, having upper and lower portions hinged horizontally, the hinged joint appearing at the point where the upper and lower links are connected to the tubular guard 13. The design of the fender is such that the guards extend laterally beyond the wheels and that the lower edge thereof, when the upper and lower links are alined, is just nicely clear of the roadway.

At a location somewhat back from the front end of the chassis I locate a pair of pivoted levers 18 and 19, which levers are in the present instance shown as pivotally connected to the chassis itself. The upper ends of these levers are connected pivotally by means of bars 20 and 21 to the upper links, while the lower ends of said bars are connected pivotally by a further pair of bars 22 and 23 with the lower ends of the lower links, which it will be noticed are back-turned as indicated at 14' and 15'.

24 and 25 are spiral springs having their lower ends connected to the lower guard 17 and their upper ends fastened by suitable eyes 26 more or less centrally to the bars 22 and 23.

27 is a stop bar permanently secured centrally to the guard 16 and extending upwardly and inwardly.

28 is a bar or link having the forward end thereof pivotally secured to the upper end of the lever 18 and the rear end thereof pivotally fastened to a hand lever 29 suitably mounted on the chassis of the automobile.

The above completes the description of the parts, but in order that they may be better understood I will now describe the manner in which the fender operates, assuming that it is initially set in the up position, that is, as shown in Fig. 1 of the drawings. In this figure it will be noticed that the guard 13 is advanced and elevated, the fender being held in this position by the action of the springs 24 and 25 which are operating to pull the guard 17 backwardly and buckle upwardly the joint formed between the forward ends of the bars 22 and 23 and the back-turned ends 14' and 15' of the lower links. The upward buckling of this joint is, however, arrested by the stop bar 27, the upper end of which engages with the back side of the guard 12. Accordingly, the fender once set in this position will retain the position. Upon the fender engaging with an object, such as a person, the object will hit the advanced guard 13 with the result that the joint formed between the meeting ends of the upper and lower links will be broken backwardly and will effect the bringing of the upper and lower portions of the fender into the position shown in Fig. 2 of the drawings, which is the dropped or operating position thereof. As the fender drops the springs will be extended as the bars 22 and 23 straighten, and the lower bars and levers are designed such that the springs, which are at this time in tension, will effect the pulling ahead of the upper ends of the bars 22 and 23 so that the pivot points of these bars with the levers will be in advance of the pivot points of the lever with the chassis. This arrangement positively prevents, once the fender is dropped, the lower edge of the fender from being forced back by the object, as it will be apparent any back swing of the lower edge of the fender would require a swing of the lower ends of the levers in the direction indicated by the arrow (Fig. 2) and such a swing is impossible owing to the upper ends of the levers being unable to swing downwardly owing to their connection through the top bars with the upper portion of the fender, which in the dropped position has the links 10 and 11 thereof engaging with the forward ends of the chassis. From the above it is apparent that the object cannot pass beneath the car or under the wheels. To reset the fender it is only necessary for the driver of the automobile to throw the hand lever 29 forwardly. This action effects, through the link, the buckling of the parts such that the springs 24 and 25 operate to draw back the two parts of the fender to their initial position, or as shown in Fig. 1 of the drawing.

If during the driving of the automobile one observes an object on the roadway, before the object is actually struck by the fender, he can set off the fender from the automobile by drawing back the lever. By being able to manipulate the fender from the car one can catch small objects which would not be high enough to strike the advanced portion of the fender and set it off. This is an important feature, as otherwise small objects, if not seen in time to stop the automobile, would be run over as the fender would not be hit or struck by them.

I wish it to be particularly noticed that this fender is locked, so to speak, in both the upper and lower positions, as hereinbefore described, and that although locked it can be very easily set off to arrest an object striking it and that it will operate quickly and positively to drop on being hit.

What I claim as my invention is:—

1. The combination with the chassis of an automobile, of a horizontally and pivotally jointed two-part fender pivotally suspended from the chassis, means retaining the fender in a set collapsed position with the joint advanced for engagement with an object and releasable means for locking the fender in an extended position with the two parts thereof contained in the same plane.

2. The combination with the chassis of an automobile, of a horizontally and pivotally jointed two-part fender pivotally suspended from the front end of the chassis, a pair of levers pivotally secured to the chassis to the rear of the fender, a pair of bars connecting the upper ends of the levers with the upper portion of the fender, a pair of bars connecting the lower ends of the levers with the lower part of the fender and spring means connecting the lower pair of bars with the lower part of the fender.

3. The combination with the chassis of an automobile, of a horizontally and pivotally jointed two-part fender pivotally suspended from the front end of the chassis, a pair of levers pivotally secured to the chassis to the rear of the fender, a pair of bars connecting the upper ends of the levers with the upper portion of the fender, a pair of bars connecting the lower ends of the levers with the lower portion of the fender, spring means connecting the lower pair of bars with the lower part of the fender and a stop bar carried by the lower part of the fender and engageable with the upper part thereof in the collapsed position of the fender.

4. The combination with the chassis of an automobile, of a pair of brackets permanently secured to the front end of the chassis, a horizontally and pivotally jointed two-part fender pivotally suspended from the brackets and located in advance of the chassis, an opposing pair of levers pivotally secured to the chassis to the rear of the fender, a pair of bars connecting the upper ends of the levers pivotally to the upper portion of the fender, a pair of bars connecting the lower ends of the levers pivotally to the lower portion of the fender, springs inserted between the body portions of the latter bars and the lower portion of the fender and a stop bar secured to the lower portion of the fender and designed to engage with the upper portion thereof in the collapsed position of the fender.

5. The combination with the chassis of an automobile, of a pair of brackets permanently secured to the chassis, pairs of upper and lower opposing links having their meeting ends pivotally connected together, the upper ends of the upper links pivotally connected to the brackets and the lower ends of the lower links back-turned, guards secured to the links and passing in a direction across the chassis, a pair of opposing levers pivotally connected to the chassis, a pair of upper bars having their rear ends pivotally connected to the upper ends of the levers and their forward ends connected to the upper pair of links, a pair of lower bars having their rear ends connected to the lower ends of the levers and their forward ends pivotally connected to the back-turned ends of the lower links, a pair of coiled springs having their rear ends fastened to the bodies of the lower bars and their forward ends secured to the lowermost guard and a stop bar secured to one of the guards carried by the lower links and engageable, in the movement of the lower links with the guard carried by the upper links.

Signed at Winnipeg this 18th day of March, 1916.

FREDERICK WILLIAM HARRIS.

In the presence of—
    GERALD S. ROXBURGH,
    S. SELVERT.

Copies of this patent may be obtained for five cents each, by addressing the "Commissioner of Patents, Washington, D. C."